Patented June 11, 1940

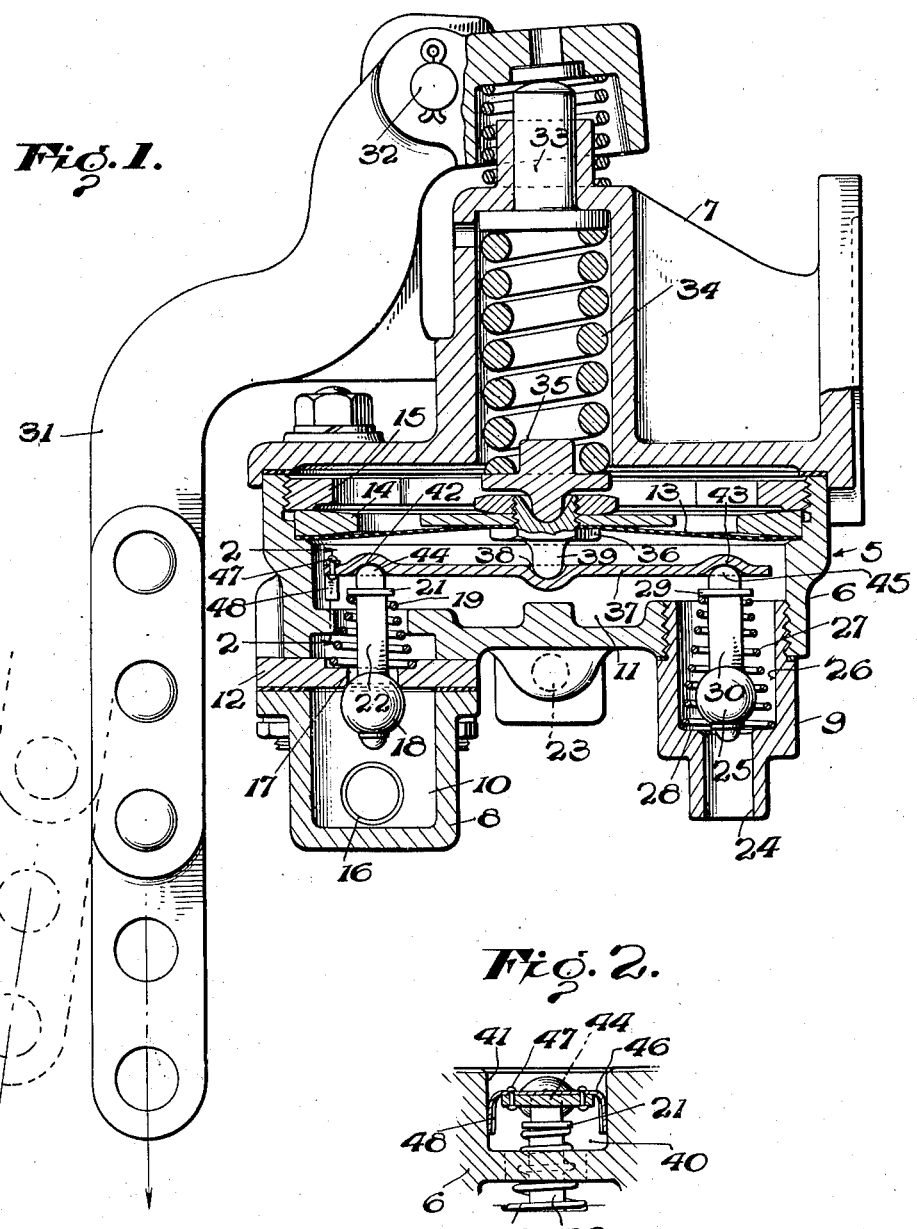
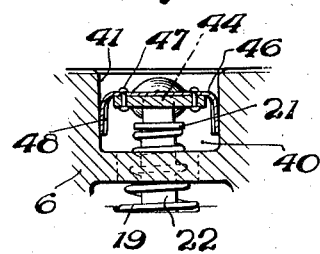

2,204,530

UNITED STATES PATENT OFFICE 2,204,530

BRAKE CONTROL VALVE

Wilfred A. Eaton, Pittsburgh, Pa., assignor to Bendix-Westinghouse Automotive Air Brake Company, Pittsburgh, Pa., a corporation of Delaware Application September 16, 1939, Serial No. 295,263

10 Claims. (Cl. 303—54)

This invention relates to control mechanisms and more particularly to a valve mechansm of the so-called self-lapping type for the control of fluid pressure.

It has heretofore been proposed to employ fluid pressure control valve mechanisms having separate intake and exhaust valves controlled by a pressure-responsive member and operated sequentially by means of a rocking beam or element interposed between the pressure-responsive member and valves, but mechanisms of this type previously employed have required the use of guiding means formed on the valves to insure uniform action and proper seating thereof. This condition has necessitated the use of relatively large valves to obtain a desired rate of flow of fluid pressure past the valves, and, since, in mechanisms of the above type, the sensitivity of the mechanism is largely dependent on the relation between the area of the pressure-responsive member and the areas of the intake and exhaust valves, correspondingly larger pressure-responsive members and associated parts have been found necessary in the construction of these mechanisms, and it is accordingly an object of the present invention to provide novel and improved control valve mechanism wherein the guiding means for the valves are so constituted as to offer a minimum restriction to the flow of fluid past the valves.

Valve mechanisms of the type described have been particularly adapted for the control of fluid pressure brakes on vehicles, where a high degree of sensitivity is essential. Fluid pressure for the operation of such brakes is usually supplied by a compressor driven at relatively high speed, and this severe operating condition has in the past tended to partially decompose the lubricating oil used in the compressor, forming a viscous substance commonly known as gum which permeates the fluid pressure system and adheres to the sliding surfaces of the valve guides and interferes with their smooth and efficient operation. It is accordingly a further object of the invention to provide valve guiding means wherein sliding surfaces are substantially eliminated and the detrimental effect of gum forming on the parts is rendered relatively negligible.

It is well known to those skilled in the art that self-lapping fluid pressure control valve mechanisms are inherently in unstable equilibrium during operation, a condition which often causes excessive vibration and consequent wear of the moving parts. Various damping means have been used for correcting this condition, but the present invention contemplates the inclusion of vibration damping means acting on the rocking beam interposed between the pressure-responsive member and the valves for effectively limiting vibration of the adjacent moving parts without interfering in any way with the novel guiding means for the valves.

Another object of the invention is to provide, in a mechanism of the above type, a novel and efficient valve and valve guiding and operating structure wherein the valves may be brought into engagement with their respective seats without the occurrence of leakage due to slight misalignment of the cooperating parts.

These and other objects and novel features of the invention will appear more fully hereinafter from the following detailed description when taken in connection with the accompanying drawing. It is to be expressly understood, however, that the drawing is employed for purposes of illustrations only and is not designed as a definition of the limits of the invention, reference being had for this purpose to the appended claims.

In the drawing, wherein similar reference characters refer to similar parts throughout the several views:

Fig. 1 is an axial sectional view of a fluid pressure control valve mechanism constructed in accordance with the principles of the present invention, and Fig. 2 is a detail view of the valve mechanism taken partially in section along line 2—2 of Fig. 1.

Referring more particularly to Fig. 1, the invention is disclosed therein as embodying a self-lapping valve mechanism including a casing 5 having a body section 6, a cover section 7, and intake and exhaust sections 8 and 9, the sections 7, 8 and 9 being secured to the body section 6 in any suitable manner as shown. The casing 5 is divided into intake and outlet chambers 10 and 11 by means of a partition 12 clamped between sections 6 and 8 and a pressure-responsive member or diaphragm 13 clamped to the upper part of body section 6 by a washer 14 and a nut 15 threadedly received in body section 6. Section 8 is provided with a supply port 16 which may be connected to a suitable source of fluid pressure not shown, and the intake chamber 10 is adapted to be connected with outlet chamber 11 through an intake port 17 formed in partition 12 and normally closed by a spherically-formed intake valve 18 urged against the lower end of the port by an intake valve spring 19 interposed between partition 12 and a shoulder 21 formed on a stem portion 22 of the valve. Chamber 11 is provided with an outlet port 23 which may be connected to fluid pressure mechanism to be controlled by the valve mechanism, and is also provided with an exhaust port 24 formed in section 9 of the casing 5 and adapted to be closed at its upper end by a spherically-formed exhaust valve 25 located in a bore 26 formed in section 9 of the casing and normally held in spaced relationship with the upper end of exhaust port 24 by a spring 27 interposed between an end wall 28 formed at the lower end of bore 26 and a shoulder 29 formed on a stem portion 30 of the valve.

In general, the principles governing the operation of the intake and exhaust valves of the present invention are similar to those disclosed in the patent to George S. Lane No. 1,556,614, dated October 13, 1925, and in the patent to Lloyd V. Lewis No. 1,533,322, dated April 14, 1925, and, in providing for such operation, an operating lever 31 is pivotally mounted on the cover section 7 by means of a pin 32 for yieldingly actuating the pressure-responsive member through a plunger 33 slidably mounted in the cover section and a graduating spring 34 interposed between the lower end of the plunger and a spring seat 35 located adjacent the lower end of the spring and in pivotal engagement with a socket member 36 secured to the diaphragm 13. The operating connection between the lever 31 and the valve stems 22 and 30 is completed by a valve-operating element 37 having a socket 38 formed on its upper side in pivotal engagement with a spherical extension 39 formed on socket member 36 and having its lower side in engagement with the stems of the valves. Rocking movement of the valve-operating element 37 about the spherical extension 39 is limited substantially to a single plane by means of a channel 40 extending across the body section 6 and having side walls 41 adjacent the sides of the valve-operating element, as shown in more detail in Fig. 2 of the drawing.

The intake valve spring 19 is stronger than the exhaust valve spring 27 and, in view of this and the foregoing description, it will be readily apparent that the pressure of fluid in outlet chamber 11 can be controlled to a very accurate degree in the manner already well known and more fully described in the above mentioned patents to Lane and Lewis, clockwise movement of lever 31 serving through the connections heretofore described to move the diaphragm downwardly, with consequent movement of the valve-operating element, which, by virtue of the difference in tension between springs 19 and 27, is first forced downwardly about its point of engagement with intake valve stem 22 to close the exhaust valve and, in further movement, is forced downwardly about its point of engagement with exhaust valve stem 30 to open the intake valve and admit fluid under pressure from inlet chamber 10 to outlet chamber 11 through intake port 17. If the lever 31 is now held stationary, the increase of fluid pressure in chamber 11 will eventually force diaphragm 13 upwardly against the tension of graduating spring 34, whereupon the intake valve will be forced upwardly to closed position by spring 19, closing fully when the force exerted upwardly on the diaphragm by the pressure in chamber 11 substantially equals the downward force exerted by graduating spring 34, and the valves will be maintained in lapped or closed position, subject only to subsequent changes in the opposing forces exerted by the diaphragm and graduating spring, an increase in the former serving to permit the exhaust valve to be opened by its spring and an increase in the latter causing the intake valve to be opened in the manner heretofore described, whereupon fluid is either exhausted from or admitted to chamber 11 until the opposing forces exerted by the diaphragm and graduating spring are again balanced.

Since the intake and exhaust valves illustrated in the present invention are not guided directly in the casing of the valve mechanism, the intake and exhaust valve springs 19 and 27 are preferably of the conical type, thus having a tendency to maintain the valves in axial alignment respectively with the intake and exhaust valve ports when the valves are in open position, while lateral movement of the valve stems in relation to the valve-operating element and casing is prevented by means of depressions 42 and 43 formed in the lower surface of the element and adapted for pivotal and guiding engagement respectively with rounded end portions 44 and 45 formed on the upper ends of valve stems 22 and 30, the valve-operating element in turn being guided by the walls of channel 40 formed in the body and by its engagement with extension 39 as previously described. Thus the valve-operating element is guided by the casing and pressure-responsive member while the valves are guided by the valve-operating element and by their respective springs, which in turn insure the maintenance of proper engagement between the valves and element and between the element and diaphragm-carried extension 39 under all conditions of operation. It will be apparent that, by the present invention, a structure is provided wherein the spherically-formed valves are resiliently rather than positively guided, with the result that the valves may seat in an effective and fluid-sealing manner regardless of any slight misalignment of the various parts of the valve mechanism, while the absence of sliding guides formed on the valves minimizes the danger of the valves sticking due to foreign matter in the mechanism, and at the same time permits a relatively unrestricted flow of fluid past the valves when the latter are in open position.

The tendency of the intake and exhaust valves to vibrate in valve mechanisms of the instant type is due to the fact that, when operating, one or both of the valves may be subjected to a pressure differential when in closed position, while opening of the intake valve for instance, will substantially eliminate the effect of this differential acting to maintain the valve in closed position, with the result that the valve will open wider than necessary in response to a predetermined movement of the lever 31 and admit an excess amount of fluid pressure to outlet chamber 11, which must be exhausted by opening of the exhaust valve before the opposing forces exerted by the graduating spring and pressure-operated diaphragm can balance and permit closing of the valves in lapped position. Since, under this condition, the exhaust valve is also subject to a fluid pressure differential, upward movement of the diaphragm in response to an increase of pressure in chamber 11 permits the exhaust valve to open more than necessary and exhaust an excess amount of fluid, whereupon the diaphragm is moved downwardly by the graduating spring to again open the intake valve, and the cycle above described is repeated with the power to sustain vibration of the parts being supplied by fluid pressure from the inlet chamber 10. Frictional damping means interacting between the intake valve and housing have been used with some success in the past for preventing this type of vibration. The valve-operating element 37, however, is directly interposed between the unstable valves which initiate the vibration and the pressure-responsive member which sustains the vibration in response to fluctuations of pressure in the outlet chamber 11, and means are accordingly provided by the present invention for damping the operating element. This means may include, as shown more particularly in Fig. 2 of the drawing, a resilient member 46 formed of spring brass or other suitable resilient material and attached to the valve-operating element 37 as by means of rivets 47. The member 46 is formed with substantially parallel side arms 48 so spaced that, when the valve mechanism is assembled with the element 37 in channel 40 of the casing, as shown, these side arms will press against the walls 41 of the channel, and, by virtue of the friction set up, will serve to damp vibratory movements of element 46 as well as the parts operatively associated therewith.

While the invention has been illustrated and described herein with considerable particularity, it is to be understood that the same is not limited to the forms shown but may receive a variety of mechanical expressions as will readily appear to those skilled in the art. Reference will, therefore, be had to the appended claims for a definition of the limits of the invention.

What is claimed is:

1. Fluid pressure control valve mechanism comprising a casing, a partition therein dividing said casing into intake and outlet chambers and having an intake valve seat formed thereon in said intake chamber, an intake valve in said intake chamber having a stem extending through said partition into said outlet chamber, a spring interposed between said partition and a portion of said valve stem for normally maintaining said valve against said seat, an exhaust port in said outlet chamber having an exhaust valve seat formed at the inner end thereof, an exhaust valve for engaging said seat and having a stem in said outlet chamber, a spring interposed between the casing and a portion of said exhaust valve stem for normally maintaining said exhaust valve in open position, a pressure-responsive member carried by the casing for controlling the valves and forming a wall of the outlet chamber, means for moving the pressure-responsive member to actuate the valves, and means for operatively connecting said pressure-responsive member and valves comprising a bar having means on one side for pivotally engaging each of the valve stems and means on the other side located intermediate the valve-engaging means for pivotally engaging the pressure-responsive member, said valve springs, bar and pivotal engaging means providing the sole guiding means for said valve stems and valves.

2. The combination in a fluid pressure control valve having a casing provided with intake and exhaust valves, a spring for normally closing the intake valve and a pressure-responsive member for controlling the valves, of a valve-actuating element interposed between said valves and pressure-responsive member having recessed guiding means for pivotally engaging said valves and member, and a spring interposed between said casing and exhaust valve for normally maintaining the latter in open position and for maintaining the recessed guiding means of said actuating element in pivotal engagement with said valves and member, whereby the element is guided by the pressure-responsive member and the valves are guided by the actuating element and valve springs.

3. The combination in a fluid pressure control valve having a casing provided with intake and exhaust valves and a pressure-responsive member for controlling the valves, of means for guiding and actuating the valves comprising an element interposed between the pressure-responsive member and valves and in pivotal and guiding engagement therewith, means carried by the casing for guiding movements of said element in one plane, a spring interposed between the casing and a portion of the intake valve for normally maintaining said valve in closed position, and a spring interposed between the casing and a portion of the exhaust valve for normally maintaining the valve in open position and for resiliently maintaining pivotal and guiding engagement of the element with said valves and pressure-responsive member, whereby the element is guided by the casing means and pressure-responsive member and the valves are guided by their respective springs and by the element.

4. Fluid pressure control valve mechanism comprising a casing, a partition therein formed with an intake valve seat, said partition dividing the casing into intake and outlet chambers, an intake valve in said intake chamber adapted to engage said seat and having a stem extending through said partition into said outlet chamber, an exhaust port formed in said outlet chamber in spaced relationship with said intake valve seat, an exhaust valve in said outlet chamber adjacent said port having a stem extending upwardly in said chamber, a pressure-responsive member carried by the casing for controlling the operation of said valves, means for actuating the pressure-responsive member, means for guiding and operating said valves comprising an element interposed between the pressure-responsive member and valve stems for moving the valves in one direction on corresponding movement of the pressure-responsive member, cooperating means carried by said member and element for effecting pivotal engagement therebetween and for preventing relative lateral movement therebetween, means carried by the housing for preventing rotation of said element about the vertical axis of said pivotal engaging means, cooperating means carried by said element and valve stems for effecting pivotal engagement therebetween and for preventing relative lateral movements therebetween, and means for effecting movements of the valves in the opposite direction in response to corresponding movement of the pressure-responsive member and for maintaining pivotal engagement between said member and element and between said element and valves comprising a spring interposed between said partition and a portion of the intake valve stem and a second spring interposed between the casing and a portion of the exhaust valve stem.

5. Fluid pressure control valve mechanism comprising a casing, a partition therein formed with an intake valve seat, said partition dividing the casing into inlet and outlet chambers, an intake valve in said intake chamber adapted to engage said seat and having a stem extending through said partition into said outlet chamber, an exhaust port formed in said outlet chamber in spaced relationship with said intake valve seat, an exhaust valve in said outlet chamber having a stem extending upwardly in said outlet chamber, a pressure-responsive member carried by the casing for controlling the operation of said valves, means for actuating the pressure-responsive member, and means forming the sole guiding and operating means for said valves comprising an element interposed between the pressure-responsive member and valve stems for imparting downward movements thereto on corresponding movement of the pressure-responsive member, cooperating means carried by said member and element for effecting pivotal engagement therebetween and for preventing relative lateral movement of the member and element, means carried by the housing and cooperating with said element for preventing rotation of the latter about the vertical axis of said pivotal engaging means, cooperating means carried by said element and valve stems for effecting pivotal engagement therebetween and for preventing relative lateral movements of the valve stems and element, and means for maintaining pivotal engagement between said element and pressure-responsive member and between said element and valve stems and for effecting upward movements of the valves on corresponding movement of the pressure-responsive member including a spring interposed between the partition and the stem of the intake valve and a spring interposed between the casing and the stem of the exhaust valve.

6. A fluid pressure control valve mechanism comprising a casing provided with intake and exhaust valve ports, an outwardly-opening intake valve associated with said intake port, an inwardly-opening exhaust valve associated with said exhaust port, a pressure-responsive member associated with the casing for controlling the operation of said valves, means for actuating said pressure-responsive member, a valve-operating element interposed between said pressure-responsive member and valves, means carried by said member, element and valves for effecting pivotal engagement between the member and element and between the element and valves for preventing relative lateral displacement of the parts, a spring interposed between the intake valve and casing for normally urging said valve to intake port-closing position, a spring interposed between the exhaust valve and casing for normally urging the latter to exhaust port-opening position, and means carried by the housing and guiding said element for substantially limiting to a single plane the relative rotation of the parts about said pivotal engaging means.

7. The combination in a fluid pressure control valve having a casing provided with intake and exhaust valves and a pressure-responsive member for controlling the operation of the valves, of a valve-operating element interposed between said member and valves and having means for pivotally engaging said member and valves for preventing lateral movement of said element with respect thereto, means carried by the housing and cooperating with said element for limiting rotation of the latter about said pivotal engaging means to a single plane, and means for maintaining pivotal engagement between said valves and element and between said element and member comprising a spring interposed between said casing and intake valve and a second spring interposed between said casing and exhaust valve.

8. The combination in a fluid pressure control valve having a casing provided with intake and exhaust valves and a pressure-responsive member for controlling the operation of the valves, of a valve-operating element interposed between said member and valves and having means for pivotally engaging said member and valves for preventing lateral movement of said element with respect to said member and valves, means carried by the casing and cooperating with said element for restricting rotation thereof about said pivotal engaging means to a single plane, means for maintaining pivotal engagement between said valves and element and between said element and member comprising a spring interposed between said casing and intake valve and a second spring interposed between said casing and exhaust valve, and means interposed between said element and casing for retarding rotational movement of said element about said pivotal engaging means.

9. The combination in a fluid pressure control valve having a casing provided with intake and exhaust valves and a pressure-responsive member for controlling the operation of the valves, of a valve-operating element interposed between said member and valves and having means for pivotally engaging said member and valves for preventing lateral movement of said element with respect to said member and valves, means carried by said housing for guiding said element and restricting rotation thereof about said pivotal engaging means to a single plane, means for maintaining pivotal engagement between said valves and element and between said element and member comprising a spring interposed between said casing and intake valve and a second spring interposed between said casing and exhaust valve, and means carried by the element and in frictional engagement with the casing for retarding movement of said element with respect to said casing.

10. The combination in a fluid pressure control valve having a casing enclosing intake and exhaust valves and a pressure-responsive member for controlling the operation of the valves, of a valve-operating element interposed between said member and valves, means carried by said element and member and by said element and valves for effecting pivotal operating and guiding engagements therebetween, means carried by the casing for guiding movements of said element with respect to said first named means, and resilient means interposed between said casing and valves for maintaining engagement between said valves and element and between said element and member, whereby said element is guided by said member and casing and said valves are guided solely by said element and resilient means.

WILFRED A. EATON.